United States Patent
Kitamura

(10) Patent No.: US 12,552,379 B2
(45) Date of Patent: Feb. 17, 2026

(54) STAGGERING DETERMINATION DEVICE, STAGGERING DETERMINATION METHOD, AND STORAGE MEDIUM

(71) Applicant: TOYOTA JIDOSHA KABUSHIKI KAISHA, Toyota (JP)

(72) Inventor: Kota Kitamura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 42 days.

(21) Appl. No.: 18/660,237

(22) Filed: May 10, 2024

(65) Prior Publication Data

US 2025/0108805 A1 Apr. 3, 2025

(30) Foreign Application Priority Data

Sep. 28, 2023 (JP) ................................ 2023-167523

(51) Int. Cl.
*B60W 30/16* (2020.01)

(52) U.S. Cl.
CPC ....... *B60W 30/16* (2013.01); *B60W 2540/225* (2020.02); *B60W 2554/80* (2020.02)

(58) Field of Classification Search
CPC ........... B60W 30/16; B60W 2540/225; B60W 2554/80; B60W 2420/403; B60W 2540/18; B60W 2540/223; B60W 50/14; B60W 30/02; B60W 30/0956; B60W 40/08; B60W 40/10; B60W 50/00; B60W 2050/0043
See application file for complete search history.

(56) References Cited

U.S. PATENT DOCUMENTS

| | | | |
|---|---|---|---|
| 9,805,275 B2 | 10/2017 | Okuda | |
| 10,525,981 B2 | 1/2020 | Matsumura | |
| 10,579,056 B2 | 3/2020 | Matsumura | |
| 10,649,452 B2 | 5/2020 | Ichikawa et al. | |
| 10,706,299 B2 | 7/2020 | Matsumura | |

(Continued)

FOREIGN PATENT DOCUMENTS

| | | |
|---|---|---|
| JP | 2009-023481 A | 2/2009 |
| JP | 2014-021664 A | 2/2014 |

(Continued)

OTHER PUBLICATIONS

Machine translation of JP-2020111142-A (Year: 2020).*
Machine translation of JP-2015102891-A (Year: 2015).*
Machine translation of KR-101654522-B1 (Year: 2016).*

*Primary Examiner* — Navid Z. Mehdizadeh
*Assistant Examiner* — Caitlin R McCleary
(74) *Attorney, Agent, or Firm* — SoraIP, Inc.

(57) ABSTRACT

The staggering determination device includes a staggering determination unit that determines whether or not there is a fluctuation in traveling of the own vehicle, and in a case where there is a target in the vicinity of the own vehicle traveling and a face or a line of sight of the driver of the own vehicle is directed to the target, the threshold value changing unit changes the fluctuation determination threshold used by the threshold value changing unit for determining whether or not there is a fluctuation in traveling of the own vehicle according to the positional relationship between the own vehicle and the target, or the staggering determination unit stops the determination of whether or not there is a fluctuation in traveling of the own vehicle.

1 Claim, 6 Drawing Sheets

(56) References Cited

U.S. PATENT DOCUMENTS

| | | |
|---|---|---|
| 10,814,880 B2 | 10/2020 | Kishi |
| 10,895,875 B2 | 1/2021 | Hashimoto et al. |
| 10,915,100 B2 | 2/2021 | Matsushita et al. |
| 11,173,919 B2 | 11/2021 | De Weser et al. |
| 2011/0313259 A1* | 12/2011 | Hatakeyama ......... B60W 40/08 600/300 |
| 2018/0334166 A1* | 11/2018 | Zhu ....................... B60W 30/12 |
| 2021/0284237 A1 | 9/2021 | Miyano et al. |
| 2023/0162609 A1* | 5/2023 | Fujimoto ............... G06V 20/58 340/904 |

FOREIGN PATENT DOCUMENTS

| | | | |
|---|---|---|---|
| JP | 2015102891 A * | 6/2015 | |
| JP | 2017-107299 A | 6/2017 | |
| JP | 2020111142 A * | 7/2020 | |
| JP | 7247931 B2 | 3/2023 | |
| KR | 101654522 B1 * | 9/2016 | ......... G06K 9/00798 |

* cited by examiner

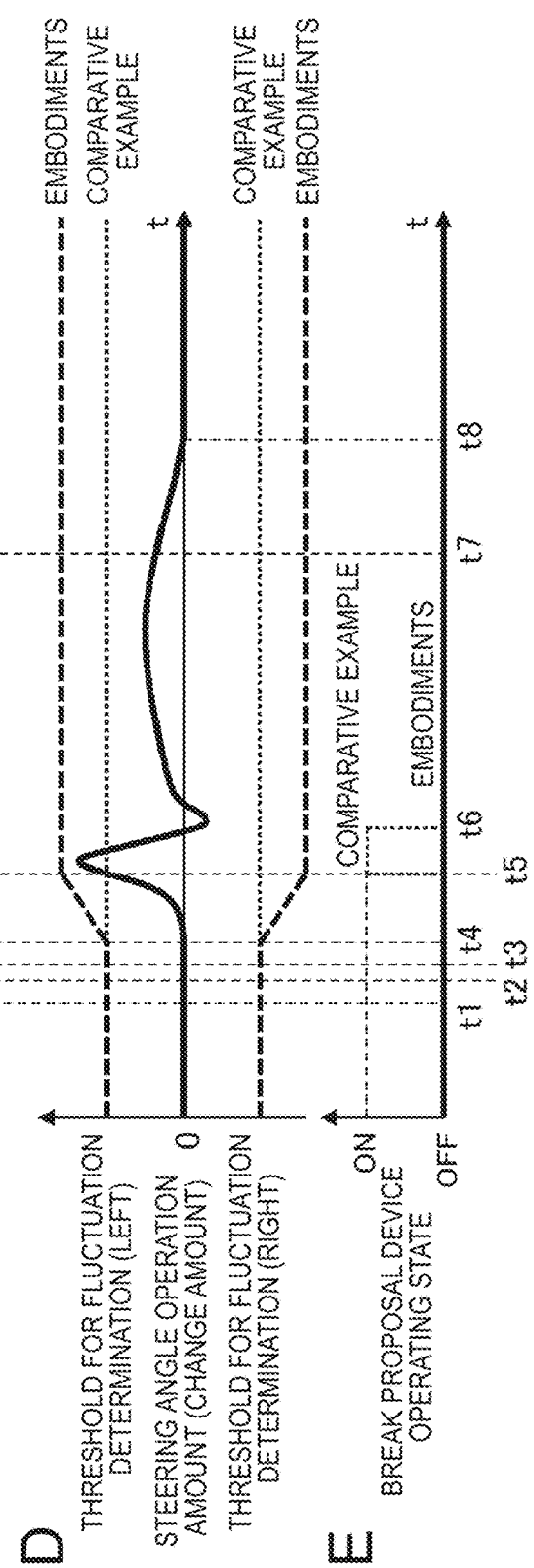

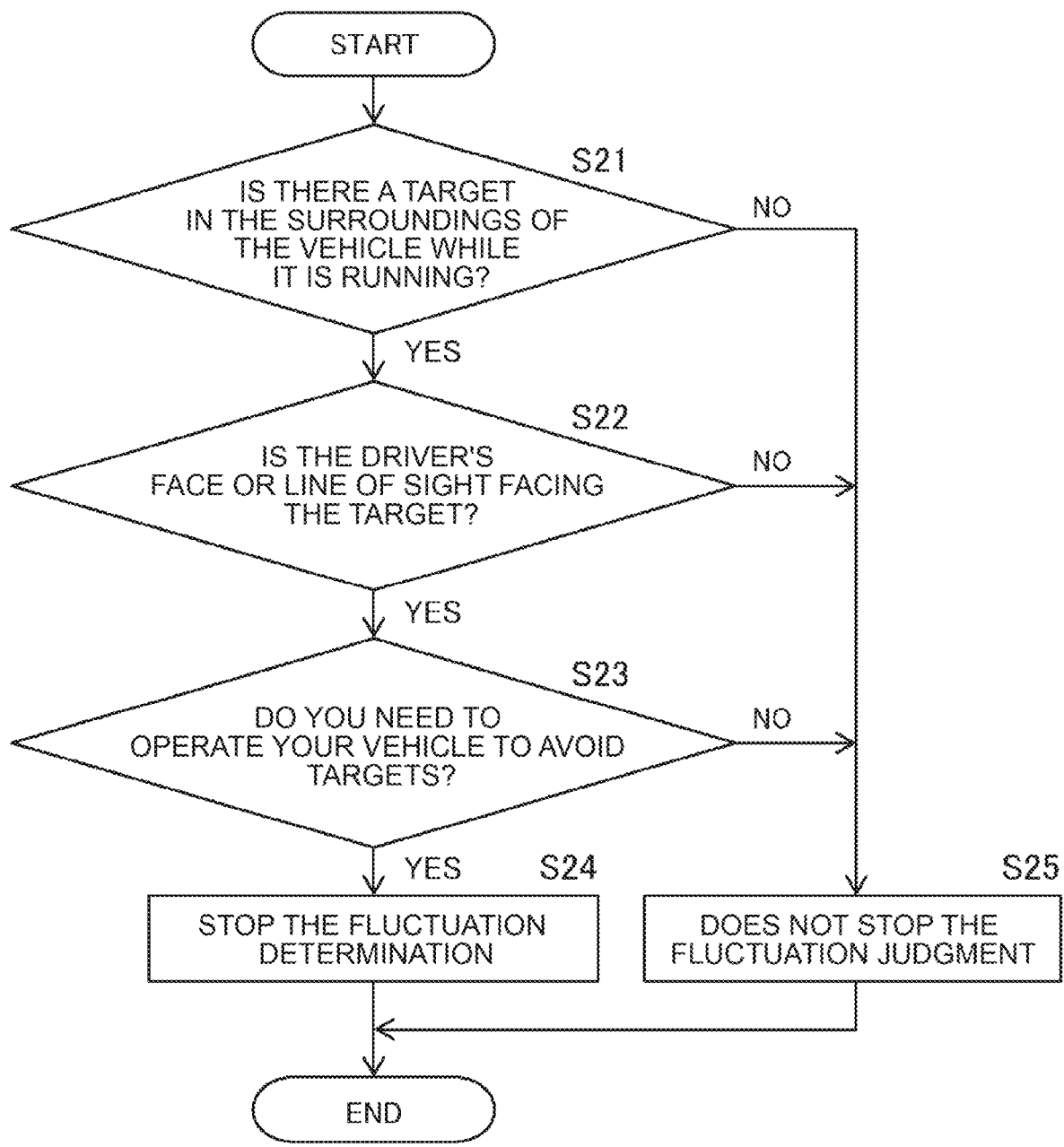

STAGGERING DETERMINATION DEVICE, STAGGERING DETERMINATION METHOD, AND STORAGE MEDIUM

CROSS-REFERENCE TO RELATED APPLICATION

This application claims priority to Japanese Patent Application No. 2023-167523 filed on Sep. 28, 2023, incorporated herein by reference in its entirety.

BACKGROUND

1. Technical Field

The present disclosure relates to a staggering determination device, a staggering determination method, and a storage medium.

2. Description of Related Art

Japanese Unexamined Patent Application Publication No. 2017-107299 (JP 2017-107299 A) describes a technique of determining staggering of a vehicle. In the technique described in JP 2017-107299 A, staggering behavior is learned for each travel scene of the vehicle, and staggering of the vehicle is determined using the learning result.

SUMMARY

With the technique described in JP 2017-107299 A, staggering behavior of the vehicle is not learned at the time of overtaking during a lane change and before and after a lane change, at the time when a large-sized vehicle adjacent to the host vehicle is moving sideways toward the host vehicle, at the time of travel in a section with a reduced lane width due to a road work or an obstacle, or the like. That is, these scenes are set as learning exclusion scenes. That is, with the technique described in JP 2017-107299 A, staggering behavior of the vehicle is not learned at the time of overtaking before and after a lane change (i.e., when the host vehicle overtakes a preceding vehicle as a target existing around the host vehicle before and after a lane change), at the time when a large-sized vehicle adjacent to the host vehicle is moving sideways toward the host vehicle (i.e., when a large-sized vehicle as a target existing around the host vehicle is moving sideways toward the host vehicle during travel), at the time when the host vehicle travels in a section in which the lane width for which vehicles can travel is reduced and in which a road work signboard or the like as a target is placed, and at the time when the host vehicle travels in a section in which the lane width for which vehicles can travel is reduced and in which an obstacle as a target is present. Therefore, with the technique described in JP 2017-107299 A, there is a possibility that the presence or absence of staggering of the host vehicle during travel cannot be appropriately determined at such times (i.e., when a target is present around the host vehicle during travel and the host vehicle travels in a scene in which learning is not performed).

In view of the above, it is an object of the present disclosure to provide a staggering determination device, a staggering determination method, and a storage medium capable of appropriately determining the presence or absence of staggering of the host vehicle during travel. In particular, an object of the present disclosure is to provide a staggering determination device, a staggering determination method, and a storage medium. The staggering determination device, the staggering determination method, and the storage medium can suppress a possibility that the behavior of the host vehicle accompanying an operation by a driver of the host vehicle to avoid a target existing around the host vehicle during travel is erroneously determined as staggering of the host vehicle.

An aspect of the present disclosure provides
a staggering determination device including
a staggering determination unit that determines presence or absence of staggering during travel of a host vehicle, in which
when a target is present around the host vehicle during the travel and a face or a line of sight of a driver of the host vehicle is directed to the target, a threshold value changing unit changes a staggering determination threshold value that is used to determine the presence or absence of the staggering during the travel of the host vehicle, or the staggering determination unit stops determining the presence or absence of the staggering during the travel of the host vehicle, according to a positional relationship between the host vehicle and the target.

According to the present disclosure, it is possible to appropriately determine the presence or absence of staggering of the host vehicle during travel.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5A is a diagram for describing a specific example in which the threshold value changing unit C5 changes the threshold value for the fluctuation determination, and indicates a temporal change (temporal change of the determination result of the target presence determination unit C2) of the recognition result of the peripheral vehicle by the surrounding condition sensor 12 when the own vehicle 1 overtakes the peripheral vehicle (target TG) (when the peripheral vehicle enters the scheduled traveling area LA of the own vehicle 1);

FIG. 5B is a diagram for describing a specific example in which the threshold value changing unit C5 changes the threshold value for the fluctuation determination, and shows a time-dependent change in the amount of intrusion (overlap amount OA) of the surrounding vehicle (target TG) into the scheduled traveling area LA of the host vehicle 1 when the host vehicle 1 overtakes the surrounding vehicle (target TG) (when the surrounding vehicle enters the scheduled traveling area LA of the host vehicle 1);

FIG. 5C is a diagram for describing a specific example in which the threshold value changing unit C5 changes the threshold value for the fluctuation determination, and shows a temporal change (temporal change of the determination result of the target recognition determination unit C3) of the recognition state of the peripheral vehicle by the driver of the own vehicle 1 when the own vehicle 1 overtakes the peripheral vehicle (target TG) (when the peripheral vehicle enters the scheduled traveling area LA of the own vehicle 1);

FIG. 5D is a diagram for describing a specific example in which the threshold value changing unit C5 changes the threshold value for the fluctuation determination, and shows a change with time of the operating amount of the steering angle by the driver of the own vehicle 1 and a change with time of the threshold value for the fluctuation determination (left) and the threshold value for the fluctuation determination (right) when the own vehicle 1 overtakes the surrounding vehicle (target TG) (when the surrounding vehicle enters the scheduled traveling area LA of the own vehicle 1);

FIG. 5E is a diagram for describing a specific example in which the threshold value changing unit C5 changes the threshold value for the fluctuation determination, and shows a change with time of the operation status of the rest proposal device 19 when the vehicle 1 overtakes the surrounding vehicle (target TG) (when the surrounding vehicle enters the scheduled traveling area LA of the vehicle 1); and FIG. 6 is a flow chart for explaining an exemplary process executed by the processor 18C of the staggering determination device 18 according to the second embodiment.

DETAILED DESCRIPTION OF EMBODIMENTS

Embodiments of a staggering determination device, a staggering determination method, and a storage medium according to the present disclosure will be described below with reference to the drawings.

First Embodiment

Figure 1:
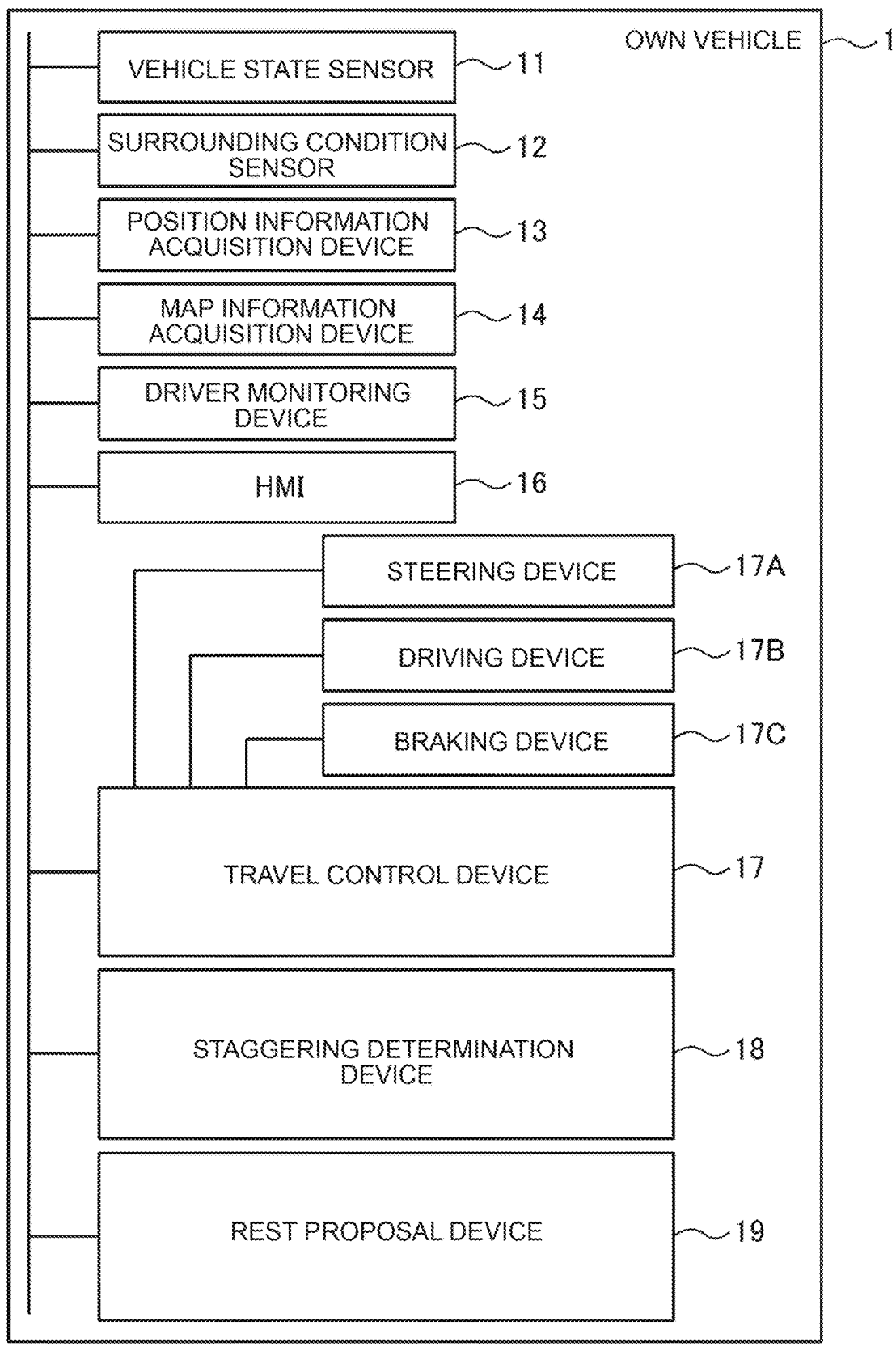
FIG. 1 is a diagram illustrating an example of a host vehicle 1 to which a staggering determination device 18 according to a first embodiment is applied.
Figure 2:
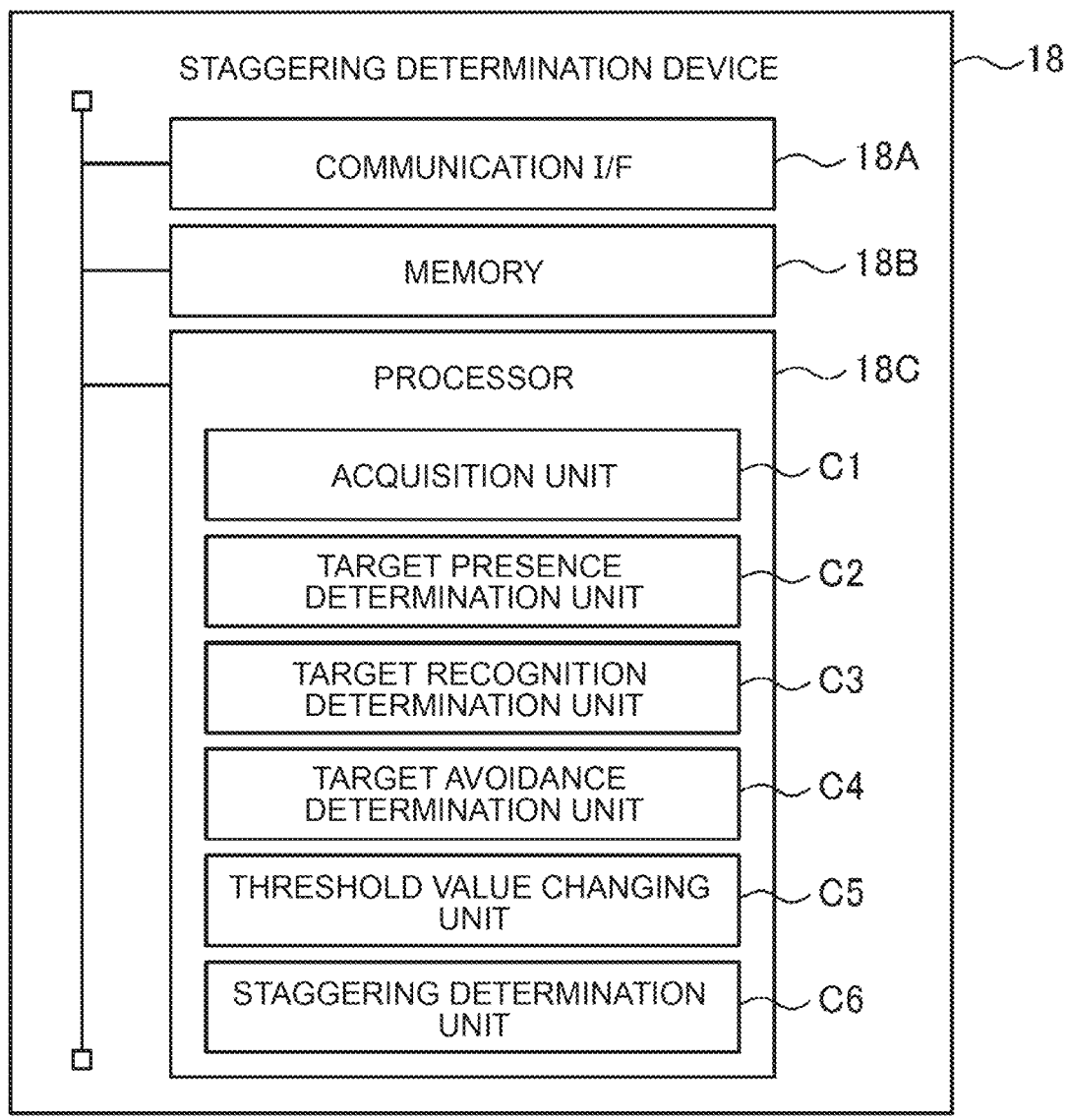
FIG. 2 is a diagram showing an example of a specific configuration of the staggering determination device 18 shown in FIG. 1.

FIG. 1 is a diagram illustrating an example of the host vehicle 1 to which the staggering determination device 18 according to the first embodiment is applied. FIG. 2 is a diagram illustrating an example of a specific configuration of the staggering determination device 18 illustrated in FIG. 1.

In the examples illustrated in FIGS. 1 and 2, the host vehicle 1 includes a vehicle state sensor 11, a surrounding condition sensor 12, a position information acquisition device 13, a map information acquisition device 14, and a staggering determination device 18.

The vehicle state sensor 11 detects the state of the host vehicle 1. The vehicle state sensor 11 includes, for example, a vehicle speed sensor, a yaw rate sensor, an acceleration sensor, a steering angle sensor, a torque sensor that detects a steering torque, and the like. The vehicle state sensor 11 transmits the detection result of the state of the host vehicle 1 to the staggering determination device 18 or the like.

The surrounding condition sensor 12 detects a target TG (see FIG. 4) or the like existing in the vicinity of the host vehicle 1. The target TG includes, for example, a surrounding vehicle (for example, a preceding vehicle, a neighboring vehicle, or the like), a falling object, a guardrail, an obstacle (for example, a construction sign, an accident handling vehicle, or the like), a pedestrian, a utility pole installed in the traveling path L (see FIG. 4), a division line (white line) LL, LR installed on the road surface of the traveling path L (see FIG. 4), a roadside object, or the like. The surrounding condition sensor 12 includes, for example, a camera, a Laser Imaging Detection and Ranging (LIDAR), a radar, a sonar, and the like. The surrounding condition sensor 12 transmits, to the staggering determination device 18 or the like, the detected target TG or the like existing in the vicinity of the host vehicle 1.

The position information acquisition device 13 acquires information indicating the position and the azimuth of the host vehicle 1. The position information acquisition device 13 includes, for example, a Global Positioning System (GPS) device that measures the position and the azimuth of the host vehicle 1. The position information acquisition device 13 may perform a known self-position estimation process (localization) to increase the accuracy of information indicating the position and the azimuth of the host vehicle 1. The position information acquisition device 13 may have a function of detecting the position of the host vehicle 1 in the widthwise direction (vertical direction in FIG. 4) of the traveling path L in the traveling path L of the host vehicle 1 based on images including the division line LL, LR captured by the camera. The position information acquisition device 13 transmits information indicating the position and the azimuth of the host vehicle 1 to the staggering determination device 18 or the like.

The map information acquisition device 14 acquires map information indicating a lane arrangement, a road shape, and the like from the map database. The map database may be stored in a storage device (not shown) mounted on the host vehicle 1, or may be stored in a management server outside the host vehicle 1. In an example in which the map database is stored in a management server outside the host vehicle 1, the map information acquisition device 14 acquires the map information from the map database via communication between the host vehicle 1 and the management server. The map information acquisition device 14 may detect (calculate) the curvature of the traveling path L of the host vehicle 1, and acquire information indicating the curvature of the traveling path L of the host vehicle 1 as the map information. The map information acquisition device 14 transmits map information indicating the lane arrangement, the road shape, and the like to the staggering determination device 18 and the like.

Further, the host vehicle 1 includes a driver monitoring device 15, a Human Machine Interface (HMI) 16, and a rest proposal device 19.

The driver monitoring device 15 includes a driver monitor camera or the like that captures a driver monitor camera image including the face of the driver of the host vehicle 1. The driver monitor camera is disposed on an upper portion of a steering column (not shown) of the own vehicle 1 so as to be able to capture an image of a face and a part of the upper body of the driver of the own vehicle 1.

In another example, the driver monitor camera may be disposed in a center cluster of the host vehicle 1, or the driver monitor camera may be disposed in a room mirror, a meter panel, a meter hood, or the like of the host vehicle 1. Also in these examples, the driver monitor camera can image the face and a part of the upper body of the driver of the host vehicle 1.

In the examples illustrated in FIGS. 1 and 2, the driver monitoring device 15 generates line-of-sight information indicating the direction of the face or line of sight of the driver of the host vehicle 1 based on the driver monitor camera image including the face of the driver of the host vehicle 1 captured by the driver monitor camera. Then, the driver monitoring device 15 transmits the line-of-sight information to the staggering determination device 18 or the like. HMI 16 is an interface for inputting and outputting data between the rest proposal device 19 and the driver of the own vehicle 1. HMI 16 includes, based on a control signal from the rest proposal device 19, at least one of a display for giving a visual notification for proposing a rest to the driver of the host vehicle 1, a speaker for giving an audible notification for proposing a rest to the driver of the host vehicle 1, and a vibration generating device built in, for example, a steering wheel or a driver's seat for giving a tactile notification for proposing a rest to the driver of the host vehicle 1. Further, HMI 16 includes operation buttons, a touch panel, and the like that receive an input operation of the driver of the host vehicle 1.

The host vehicle 1 includes a travel control device 17, a steering device (steering actuator) 17A, a driving device (driving actuator) 17B, and a braking device (braking actuator) 17C. Examples of the steering device 17A include a power steering system, a steer-by-wire steering system, and a rear wheel steering system. The driving device 17B has a function of accelerating the host vehicle 1. Driving 17B include, for example, engines, EV (battery electric vehicle) systems, hybrid systems, fuel cell systems, and the like. The braking device 17C has a function of decelerating the host vehicle 1. The braking device 17C includes, for example, a hydraulic brake, a power regenerative brake, and the like. The travel control device 17 is constituted by a computer having a communication interface (I/F), a memory, and a processor. The travel control device 17 transmits a control signal for activating the steering device 17A to the steering device 17A in response to a steering operation or the like performed by the driver of the host vehicle 1. Further, the travel control device 17 transmits a control signal for activating the driving device 17B to the driving device 17B in response to an accelerator operation or the like by the driver of the host vehicle 1. The travel control device 17 transmits a control signal for activating the braking device 17C to the braking device 17C in response to a braking operation or the like by the driver of the host vehicle 1.

The staggering determination device 18 includes a computer having a communication interface 18A, a memory 18B (storage medium), and a processor 18C. The processor 18C has a function as an acquisition unit C1, a function as a target presence determination unit C2, a function as a target recognition determination unit C3, a function as a target avoidance determination unit C4, a function as a threshold value changing unit C5, and a function as a staggering determination unit C6.

The acquisition unit C1 acquires information indicating the state of the host vehicle 1 (for example, a detection result of the vehicle speed sensor, a detection result of the yaw rate sensor, a detection result of the steering angle sensor (an operation amount of the steering angle of the steering), a detection result of the torque sensor (a steering torque), and the like) from the vehicle state sensor 11. Further, the acquisition unit C1 acquires the detection result of the target TG or the like existing in the vicinity of the host vehicle 1 by the surrounding condition sensor 12. Further, the acquisition unit C1 acquires information indicating the position and the direction of the host vehicle 1 from the position information acquisition device 13, and acquires the map information from the map information acquisition device 14. Further, the acquisition unit C1 acquires, from the driver monitoring device 15, line-of-sight information (driver monitor camera image) indicating the direction of the driver's face or line of sight of the driver of the host vehicle 1.

The target presence determination unit C2 determines whether or not a target TG exists in the vicinity of the host vehicle 1 while traveling, based on the detection result of the vehicle speed sensor acquired by the acquisition unit C1, the detection result of the surrounding condition sensor 12, and the like.

The target recognition determination unit C3 determines whether or not the face or line of sight of the driver of the host vehicle 1 is directed to the target TG existing in the vicinity of the host vehicle 1 while traveling, based on line-of-sight information (driver monitor camera images) indicating the direction of the face or line of sight of the driver of the host vehicle 1 acquired by the acquisition unit C1. That is, the target recognition determination unit C3 determines whether or not the driver of the host vehicle 1 can estimate that the target TG existing in the vicinity of the host vehicle 1 that is traveling is recognized. Specifically, the target recognition determination unit C3 determines whether or not the face or line of sight of the driver of the host vehicle 1 is directed to the target TG existing in the vicinity of the host vehicle 1 while traveling on the basis of, for example, line-of-sight information (driver monitor camera image) indicating the direction of the face or line of sight of the driver of the host vehicle 1 acquired by the acquisition unit C1, an image including target TG existing in the vicinity of the host vehicle 1 while traveling captured by the camera as the surrounding condition sensor 12, and a positional relation between the driver monitor camera and the camera as the surrounding condition sensor 12.

The target avoidance determination unit C4 determines whether or not an operation (for example, an operation of a steering angle of the own vehicle 1) by the driver of the own vehicle 1 to avoid a collision or the like between the target TG existing in the vicinity of the own vehicle 1 while traveling and the own vehicle 1 is required. Specifically, the target avoidance determination unit C4 determines whether or not the driver of the host vehicle 1 needs to operate to avoid a collision or the like between the target TG existing in the vicinity of the host vehicle 1 while traveling and the host vehicle 1, for example, by using the technique described in, for example, paragraph 0085 of U.S. Pat. No. 7,247,931.

The threshold value changing unit C5 executes a process of changing a threshold value (a threshold value for determining the fluctuation) used for determining the presence or absence of the fluctuation during traveling of the host vehicle 1, which is executed by the staggering determination unit C6. Specifically, the threshold value changing unit C5 changes the threshold value for the fluctuation determination so that the staggering determination unit C6 does not erroneously determine that there is fluctuation (fluctuation of the own vehicle 1 due to fatigue, sleepiness, or the like of the driver of the own vehicle 1) while the own vehicle 1 is traveling when the driver of the own vehicle 1 performs an operation for avoiding a collision or the like between the target TG existing in the vicinity of the own vehicle 1 being traveling and the own vehicle 1.

The staggering determination unit C6 determines the presence or absence of fluctuation during traveling of the host vehicle 1. Specifically, the staggering determination unit C6 determines that there is a fluctuation in the traveling of the own vehicle 1 when the operation amount of the leftward steering angle is larger than the "fluctuation determination threshold value (left) (refer to FIG. 5D)" (when the value of the "steering angle operation amount (change amount) (refer to FIG. 5D)" is located above the fluctuation determination threshold value (left) in FIG. 5D). Further, the staggering determination unit C6 determines that there is a fluctuation in the traveling of the own vehicle 1 when the operation amount of the rightward steering angle is larger than the "fluctuation determination threshold value (right) (see FIG. 5D)" (when the value of the "steering angle operation amount (change amount)" is located below the fluctuation determination threshold value (right) in FIG. 5D). Further, when the operation amount of the leftward steering angle is equal to or less than the "flicker determination threshold value (left)" or the operation amount of the rightward steering angle is equal to or less than the "flicker determination threshold value (right)", the staggering determination unit C6 determines that there is no flicker during traveling of the host vehicle 1. The operation amount of the leftward steering angle is detected by a steering angle sensor serving as the vehicle state sensor 11. The operation amount of the rightward steering angle is detected by a steering angle sensor serving as the vehicle state sensor 11.

In another embodiment, the staggering determination unit C6 may determine that there is a fluctuation during traveling of the own vehicle 1 when the steering torque in the left direction is larger than the "fluctuation determination threshold (left)". In this case, the staggering determination unit C6 determines that there is a fluctuation in the traveling of the own vehicle 1 when the steer torque in the rightward direction is larger than the "fluctuation determination threshold (rightward)". Further, the staggering determination unit C6 determines that there is no fluctuation in the traveling of the own vehicle 1 when the leftward steering torque is equal to or less than the "fluctuation determination threshold value (left)" or the rightward steering torque is equal to or less than the "fluctuation determination threshold value (right)". The leftward steering torque is detected by a torque sensor as the vehicle state sensor 11. The rightward steering torque is detected by a torque sensor serving as the vehicle state sensor 11.

In yet another embodiment, the staggering determination unit C6 may determine that there is a fluctuation during traveling of the own vehicle 1 when the yaw rate in the counterclockwise direction is larger than the "fluctuation determination threshold (counterclockwise direction)". In this case, the staggering determination unit C6 determines that there is a fluctuation during traveling of the own vehicle 1 when the yaw rate in the clockwise direction is larger than the "fluctuation determination threshold (clockwise direction)". Further, the staggering determination unit C6 determines that there is no fluctuation in the traveling of the own vehicle 1 when the yaw rate in the counterclockwise direction is equal to or less than the "fluctuation determination threshold value (counterclockwise direction)" or the yaw rate in the clockwise direction is equal to or less than the "fluctuation determination threshold value (clockwise direction)". The counterclockwise yaw rate is detected by a yaw rate sensor serving as the vehicle state sensor 11. The yaw rate in the clockwise direction is detected by a yaw rate sensor as the vehicle state sensor 11.

In yet another embodiment, the staggering determination unit C6 may determine that there is a fluctuation in the traveling of the own vehicle 1 when the variation of the position of the own vehicle 1 in the width-direction of the traveling path L in the traveling path L of the own vehicle 1 detected by the position information acquisition device 13 is larger than the fluctuation determination threshold. In this embodiment, the staggering determination unit C6 determines that there is no fluctuation in the traveling of the own vehicle 1 when the variation of the position of the own vehicle 1 in the widthwise direction of the traveling path L in the traveling path L of the own vehicle 1 is equal to or less than the fluctuation determination threshold value.

In yet another embodiment, in view of the fact that it is difficult to accurately determine whether or not there is any fluctuation in the traveling of the host vehicle 1 when the curvature of the traveling path L of the host vehicle 1 is large, the staggering determination unit C6 may determine that there is no fluctuation in the traveling of the host vehicle 1 when the curvature of the traveling path L of the host vehicle 1 detected (calculated) by the map information acquisition device 14 is larger than a predetermined value.

In still another example, the determination methods of the above-described examples may be combined as appropriate.

In the example illustrated in FIGS. 1 and 2, the rest proposal device 19 is constituted by a computer having a communication interface, a memory, and a processor. The rest proposal device 19 determines that there is a possibility that the driver of the own vehicle 1 has wobbled due to fatigue, sleepiness signs, and the like of the driver of the own vehicle 1 when the staggering determination unit C6 determines that there is a wobble during traveling of the own vehicle 1, and causes HMI 16 to output at least one of a visual notification, an auditory notification, and a tactile notification that propose a rest to the driver of the own vehicle 1.

The rest proposal device 19 has a function of detecting fatigue caused by the driver's side or drowsiness of the own vehicle 1 and urging the driver of the own vehicle 1 to take a rest. In the examples shown in FIGS. 1 and 2, as a method of detecting the fatigue of the driver of the host vehicle 1, a method of detecting a specific vehicle behavior induced by the fatigue of the driver of the host vehicle 1 (fluctuation during traveling of the host vehicle 1) is used. Even when the driver of the host vehicle 1 is not in a fatigued condition, when colliding or the like between the target TG existing in the vicinity of the host vehicle 1 and the host vehicle 1 needs to be avoided (for example, when avoiding a falling object as a target TG, when moving the host vehicle 1 away from a guardrail as a target TG, a vehicle in an adjoining lane AL (see FIG. 4), or the like), the same vehicle behavior occurs. In order to suppress the rest proposal device 19 urging the driver of the own vehicle 1 to take a rest when such a vehicle behavior occurs (that is, when it is required to avoid a collision or the like between the target TG existing in the vicinity of the own vehicle 1 and the own vehicle 1), in the example illustrated in FIGS. 1 and 2, the threshold value changing unit C5 changes the threshold value for the fluctuation determination. Consequently, in the examples illustrated in FIGS. 1 and 2, when there is a need to avoid a collision or the like between the target TG existing in the vicinity of the own vehicle 1 and the own vehicle 1, the staggering determination unit C6 determines that there is no wandering while the own vehicle 1 is traveling, and the rest proposal device 19 does not prompt the driver of the own vehicle 1 to take a rest.

That is, in the examples illustrated in FIGS. 1 and 2, it is possible to appropriately determine whether or not the subject vehicle 1 is swaying while traveling. Specifically, in the exemplary embodiments illustrated in FIGS. 1 and 2, it is possible to suppress a possibility that the behavior of the own vehicle 1 caused by the driver of the own vehicle 1 operating to avoid the target TG existing in the vicinity of the own vehicle 1 while traveling is erroneously determined as the fluctuation of the own vehicle 1.

Figure 3:
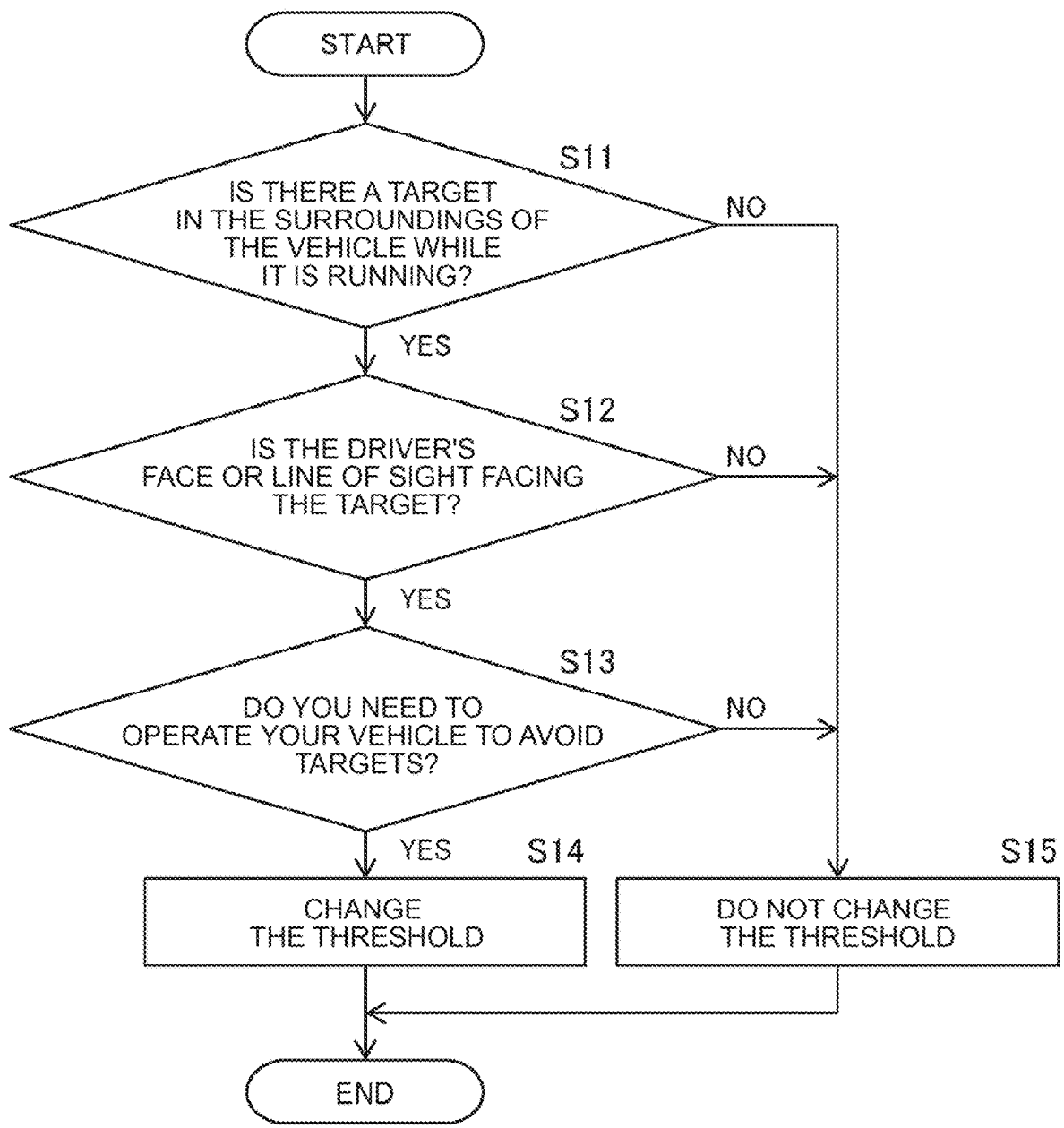
FIG. 3 is a flow chart for explaining an exemplary process executed by the processor 18C of the staggering determination device 18 according to the first embodiment.

FIG. 3 is a flow chart for explaining an exemplary process executed by the processor 18C of the staggering determination device 18 according to the first embodiment. In the embodiment illustrated in FIG. 3, in S11, the target presence determination unit C2 determines whether or not a target TG exists in the vicinity of the host vehicle 1 while traveling. If YES, proceed to S12; if NO, proceed to S15.

In S12, the target recognition determination unit C3 determines whether or not the face or line of sight of the driver of the host vehicle 1 is directed to a target TG existing in the vicinity of the host vehicle 1 while traveling. If YES, proceed to S13; if NO, proceed to S15. In S13, the target avoidance determination unit C4 determines whether or not the driver of the host vehicle 1 needs to operate to avoid a collision or the like between the target TG existing in the vicinity of the host vehicle 1 while traveling and the host vehicle 1. If YES, proceed to S14; if NO, proceed to S15.

In S14, the threshold value changing unit C5 changes the threshold value for the fluctuation determination. Specifically, the threshold value changing unit C5 changes the fluctuation determination threshold value so that the staggering determination unit C6 does not erroneously determine that there is a fluctuation in the traveling of the own vehicle 1 when the driver of the own vehicle 1 performs an operation for avoiding a collision or the like between the target TG existing in the vicinity of the own vehicle 1 being traveling and the own vehicle 1.

In S15, the threshold value changing unit C5 does not change the threshold value for the fluctuation determination. That is, in S12, when the target recognition determination unit C3 determines that the face or the line of sight of the driver of the host vehicle 1 is not directed to the target TG existing in the vicinity of the host vehicle 1 while traveling (that is, when the face or the line of sight of the driver of the host vehicle 1 is directed to a direction other than the target TG), the threshold value changing unit C5 does not change the threshold value for the fluctuation determination.

Figure 4:
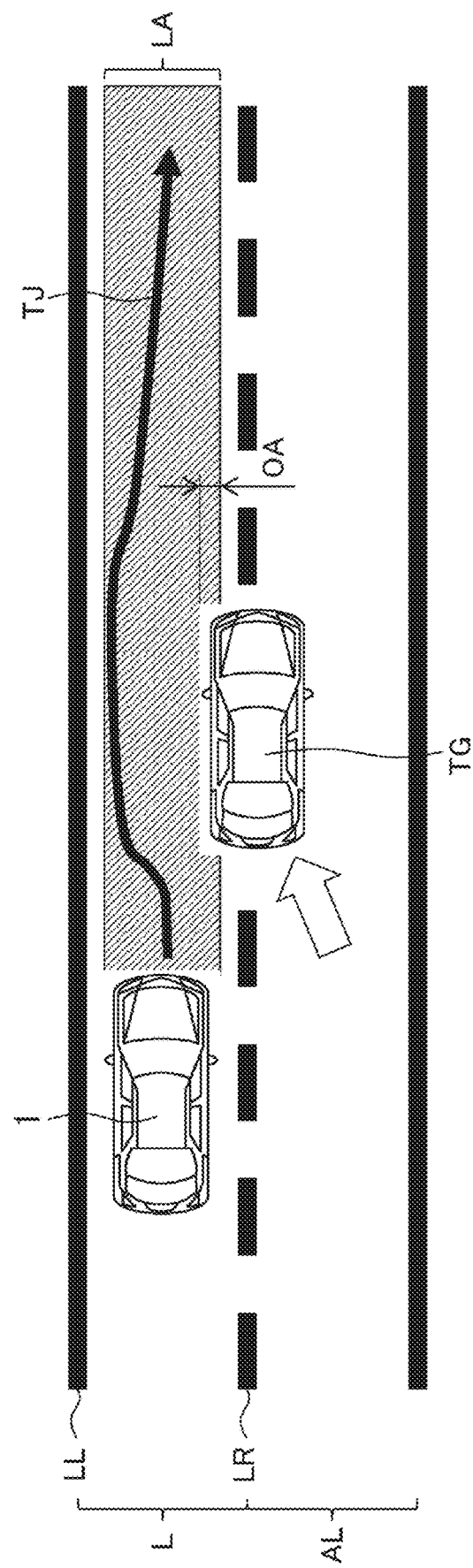
FIG. 4 is a diagram for describing a specific example in which the threshold value changing unit C5 changes the threshold value for the fluctuation determination.

FIGS. 4, and 5A to 5E are diagrams for explaining a specific embodiment in which the threshold value changing unit C5 changes the threshold value for the fluctuation determination. Specifically, FIG. 4 shows an exemplary case in which, when the own vehicle 1 overtakes a surrounding vehicle (target TG) traveling on an adjoining lane AL adjoining the traveling path L of the own vehicle 1, the surrounding vehicle enters the scheduled traveling area LA of the own vehicle 1. FIG. 5A shows a temporal change (temporal change of the determination result of the target presence determination unit C2) of the recognition result of the surrounding vehicle by the surrounding condition sensor 12 when the own vehicle 1 overtakes the surrounding vehicle (target TG) (when the surrounding vehicle enters the scheduled traveling area LA of the own vehicle 1). FIG. 5B shows the time-dependent change in the amount of intrusion (overlap amount OA) of the surrounding vehicle (target TG) into the scheduled traveling area LA of the host vehicle 1 at that time. FIG. 5C shows a temporal change of the recognition status of the surrounding vehicles by the driver of the own vehicle 1 at that time (temporal change of the determination result of the target recognition determination unit C3). FIG. 5D shows the time-dependent change of the operating quantity of the steering angle by the driver of the own vehicle 1 at that time, and the time-dependent change of the fluctuation determination threshold value (left) and the fluctuation determination threshold value (right). FIG. 5E shows the change over time of the operating condition of the rest proposal device 19 at that time.

In the example illustrated in FIGS. 4, and 5A to 5E, the surrounding condition sensor 12 recognizes (detects) the surrounding vehicle (target TG) traveling in the adjoining lane AL at the time t1, and the target presence determination unit C2 determines that the target TG exists in the vicinity of the host vehicle 1 traveling (S11 in FIG. 3 becomes YES).

The scheduled traveling area LA of the host vehicle 1 illustrated in FIG. 4 is set, for example, in a time t1 or the like by, for example, the staggering determination unit C6 or the like.

Next, at the time t2, the target recognition determination unit C3 determines that the face or line of sight of the driver of the host vehicle 1 is directed toward the surrounding vehicle (target TG) existing around the traveling host vehicle 1 based on the line-of-sight information (driver monitor camera image) indicating the direction of the face or line of sight of the driver of the host vehicle 1 (S12 in FIG. 3 becomes YES).

Next, at time t3, the surrounding vehicle (target TG) enters the traveling path L of the host vehicle 1 beyond the demarcation line LR, and the target avoidance determination unit C4 determines that an operation (an operation of the steering angle of the host vehicle 1) by the driver of the host vehicle 1 to avoid a collision or the like between the host vehicle 1 and the target TG is required (S13 of FIG. 3 becomes YES).

Next, at time t4, the surrounding vehicle (target TG) enters the scheduled traveling area LA of the host vehicle 1, and the overlap amount OA starts to be increased from zero. Further, the amount of operation of the steering angle in the leftward direction by the driver of the host vehicle 1 starts to increase. The threshold value changing unit C5 changes the fluctuation determination threshold value (left) and the fluctuation determination threshold value (right) according to the positional relation between the host vehicle 1 and the surrounding vehicle (target TG). Specifically, the threshold value changing unit C5 changes the fluctuation determination threshold value (left) and the fluctuation determination threshold value (right) according to the overlap amount OA. More specifically, the threshold value changing unit C5 changes the fluctuation determination threshold value (left) and the fluctuation determination threshold value (right) so that the staggering determination unit C6 can easily determine that there is no fluctuation during traveling of the own vehicle 1 as the overlap amount OA increases.

In another embodiment, the threshold value changing unit C5 may change the fluctuation determination threshold value (left) and the fluctuation determination threshold value (right) so that it is not determined that there is a fluctuation in the traveling of the own vehicle 1 even if the steering angle is operated by the driver of the own vehicle 1 to avoid a collision or the like between the own vehicle 1 and the preceding vehicle in accordance with the positional relationship between the own vehicle 1 and the target TG (for example, the positional relationship in a case where the distance between the own vehicle 1 and the preceding vehicle as the target TG is short and there is a possibility of a collision or the like between the own vehicle 1 and the preceding vehicle).

In the comparative example in which the fluctuation determination threshold (left) and the fluctuation determination threshold (right) according to the threshold value changing unit C5 are not changed, as shown in FIG. 5D, in the time t5, the manipulated variable of the steering angle in the leftward direction by the driver of the own vehicle 1 becomes larger than the fluctuation determination threshold (left), and it is determined that there is a fluctuation in the traveling of the own vehicle 1. As shown in FIG. 5E, the rest proposal device 19 is activated, and a notification for proposing a rest to the driver of the host vehicle 1 is performed until the time t6.

On the other hand, in the example shown in FIGS. 4, and 5A to 5E (an example of the host vehicle 1 to which the staggering determination device 18 of the first embodiment is applied), as shown in FIG. 5D, the manipulated variable of the steering angle in the leftward direction by the driver of the host vehicle 1 does not become larger than the fluctuation determination thresholds (leftward). Therefore, the staggering determination unit C6 determines that there is no fluctuation during traveling of the host vehicle 1. As a consequence, as shown in FIG. 5E, the rest proposal device 19 is not activated, and a notification for proposing a rest is not made to the driver of the host vehicle 1.

In the embodiment shown in FIGS. 4, and 5A to 5E, the own vehicle 1 overtakes the surrounding vehicle (target TG) by drawing the locus TJ shown in FIG. 4. t7 the time, the surrounding condition sensor 12 does not recognize (detect) the surrounding vehicle (target TG), and the target recognition determination unit C3 determines that the face or line of sight of the driver of the host vehicle 1 is not directed toward the surrounding vehicle (target TG). Next, at the time t8, the manipulated variable of the steering angle by the driver of the host vehicle 1 becomes zero. That is, the steering angle of the driver of the host vehicle 1 for avoiding a collision or the like between the surrounding vehicle (target TG) and the host vehicle 1 is completed.

In the embodiment illustrated in FIGS. 4, and 5A to 5E, after a predetermined period of time has elapsed since the driver of the host vehicle 1 has finished operating the steering angle to avoid a collision or the like between the surrounding vehicle (target TG) and the host vehicle 1, the fluctuation determination threshold (left) and the fluctuation determination threshold (right) are returned to the original value (value before time t4).

In another embodiment, the fluctuation determination threshold value (left) and the fluctuation determination threshold value (right) may be returned to the original value (value before time t4) at the end of the steering angle manipulation by the driver of the own vehicle 1 (time t8) to avoid a collision or the like between the surrounding vehicle (target TG) and the own vehicle 1.

Second Embodiment

The subject vehicle 1 to which the staggering determination device 18 of the second embodiment is applied is configured in the same manner as the subject vehicle 1 to which the staggering determination device 18 of the first embodiment shown in FIG. 1 is applied, except for a point to be described later. Further, the staggering determination device 18 of the second embodiment is configured in the same manner as the staggering determination device 18 of the first embodiment shown in FIG. 2, except that the processor 18C does not have a function as a threshold value changing unit C5.

FIG. 6 is a flow chart for explaining an exemplary process executed by the processor 18C of the staggering determination device 18 according to the second embodiment.

In the embodiment illustrated in FIG. 6, in S21, the target presence determination unit C2 determines whether or not a target TG exists in the vicinity of the host vehicle 1 while traveling. If YES, proceed to S22; if NO, proceed to S25.

In S22, the target recognition determination unit C3 determines whether or not the face or line of sight of the driver of the host vehicle 1 is directed to a target TG existing in the vicinity of the host vehicle 1 while traveling. If YES, proceed to S23; if NO, proceed to S25.

In S23, the target avoidance determination unit C4 determines whether or not the driver of the host vehicle 1 needs to operate to avoid a collision or the like between the target TG existing in the vicinity of the host vehicle 1 while traveling and the host vehicle 1. If YES, proceed to S24; if NO, proceed to S25.

In S24, the staggering determination unit C6 stops the determination of the presence or absence of wandering while the host vehicle 1 is traveling. Specifically, when the driver of the host vehicle 1 performs an operation for avoiding a collision or the like between the target TG existing in the vicinity of the host vehicle 1 while traveling and the host vehicle 1, the staggering determination unit C6 stops the determination of the presence or absence of the fluctuation during traveling of the host vehicle 1 so as not to erroneously determine that there is a fluctuation during traveling of the host vehicle 1.

In S25, the staggering determination unit C6 does not stop the determination of the presence or absence of the fluctuation during the traveling of the own vehicle 1 (the staggering determination unit C6 determines the presence or absence of the fluctuation during the traveling of the own vehicle 1). That is, in S22, when the target recognition determination unit C3 determines that the face or the line of sight of the driver of the own vehicle 1 is not directed toward the target TG existing in the vicinity of the own vehicle 1 while the vehicle is traveling (that is, when the face or the line of sight of the driver of the own vehicle 1 is directed in a direction other than the target TG), the staggering determination unit C6 does not perform the determination of the presence or absence of the wandering while the own vehicle 1 is traveling.

In the example illustrated in FIG. 9, when it is determined that the vehicle is YES in S23 and S24 is executed, and an operation of the steering angle by the driver of the own vehicle 1 to avoid a collision or the like between the surrounding vehicle (target TG) and the own vehicle 1 is performed, after a predetermined period of time has elapsed since the operation is completed, the staggering determination unit C6 resumes the determination of the presence or absence of the fluctuation in the traveling of the own vehicle 1.

In another embodiment, when S23 is determined to be YES and S24 is executed, and the driver of the host vehicle 1 operates the steering angle to avoid a collision or the like between the surrounding vehicle (target TG) and the host vehicle 1, the staggering determination unit C6 may resume the determination of the presence or absence of wandering while the host vehicle 1 is traveling when the operation is terminated.

As described above, embodiments of the staggering determination device, the staggering determination method, and the storage medium of the present disclosure have been described with reference to the drawings. However, the staggering determination device, the staggering determination method, and the storage medium of the present disclosure are not limited to the above-described embodiments, and can be appropriately modified without departing from the spirit of the present disclosure. The configuration of each example of the above-described embodiment may be combined as appropriate. In each example of the above-described embodiment, the processing performed in the staggering determination device 18 has been described as software processing performed by executing a program. However, the process performed by the staggering determination device 18 may be a process performed by hardware. Alternatively, the process performed in the staggering determination device 18 may be a process in which both software and hardware are combined. Further, a program (a program for realizing the functions of the processor 18C of the staggering determination device 18) stored in the memory 18B of the staggering determination device 18 may be provided and distributed by being recorded in a computer-readable storage medium such as a semiconductor memory, a magnetic recording medium, an optical recording medium, or the like.

What is claimed is:

1. A vehicle-mounted staggering detection system, comprising:

a steering angle sensor configured to detect steering angles of a host vehicle;

a surrounding condition sensor configured to detect a target vehicle in a vicinity of the host vehicle and a demarcation line between traveling lanes, and transmit the detected target vehicle information to a staggering determination device;

a driver monitoring camera configured to capture a face and generate line-of-sight information of the driver of the host vehicle; and a rest proposal device comprising a first processor, a first memory, and a communication interface, the rest proposal device configured to determine that there is a possibility that the driver has wobbled due to fatigue and sleepiness, and send a signal for a notification for prompting the driver to take a rest, wherein the staggering determination device comprises a second processor and a second memory, the second processor configured to:

determine whether the target vehicle is traveling on an adjoining lane of a traveling lane in which the host vehicle is traveling based on a recognition of the surrounding condition sensor, in response to a determination that the target vehicle is traveling on the adjoining lane, determine, from an image captured by the driver monitoring camera, whether the face or line-of-sight of the driver is directed toward the target vehicle based on the line-of-sight information;

in response to a determination that the face or the line-of-sight of the driver is directed toward the target vehicle, determine whether an operation by the driver is required to avoid a collision between the host vehicle and target vehicle, in response to a determination that the operation by the driver is required, change a left fluctuation-determination threshold value and a right fluctuation-determination threshold value according to a positional relationship between the host vehicle and the target vehicle, in a state where an amount of intrusion of the target vehicle into the traveling lane is increasing and an amount of operation of steering in one direction by the driver of the host vehicle is increasing while the host vehicle overtakes the target vehicle and the target vehicle enters the traveling lane of the host vehicle, wherein the left fluctuation-determination threshold value and the right fluctuation-determination threshold value are thresholds utilized to determine presence or absence of staggering during traveling of the host vehicle in the traveling lane, determine presence or absence of staggering during traveling of the host vehicle in the traveling lane by comparing the amount of operation of steering in the leftward direction and the amount of operation steering in the rightward direction, detected by the steering angle sensor, with the left fluctuation-determination threshold value and the right fluctuation-determination threshold value, respectively;

determine that the staggering is present in response to a determination that the amount of operation of steering angle in the leftward direction is larger than the left fluctuation-determination threshold and the amount of operation of steering angle in the rightward direction is larger than the right fluctuation-determination threshold, determine that the staggering is absent in response to a determination that the amount of operation of steering angle in the leftward direction is equal to or less than the left fluctuation-determination threshold, or the amount of operation of steering angle in the rightward direction is equal to or less than the right fluctuation-determination threshold, in response to a determination that the left fluctuation-determination threshold value and the right fluctuation-determination threshold value are changed, inhibit activation of the rest proposal device; and after the driver finishes the steering operation for collision avoidance, return the left fluctuation-determination threshold value and the right fluctuation-determination threshold value to values prior to the change.

* * * * *